(12) United States Patent
Diep

(10) Patent No.: US 10,909,573 B2
(45) Date of Patent: Feb. 2, 2021

(54) SYSTEM AND METHOD FOR ONLINE DATA MINING AND ADVERTISEMENT GENERATOR

(71) Applicant: Michael T. Diep, Fountain Valley, CA (US)

(72) Inventor: Michael T. Diep, Fountain Valley, CA (US)

( * ) Notice: Subject to any disclaimer, the term of this patent is extended or adjusted under 35 U.S.C. 154(b) by 0 days.

(21) Appl. No.: 15/598,668

(22) Filed: May 18, 2017

(65) Prior Publication Data

US 2018/0260846 A1 Sep. 13, 2018

Related U.S. Application Data

(60) Provisional application No. 62/470,247, filed on Mar. 11, 2017, provisional application No. 62/472,173, filed on Mar. 16, 2017.

(51) Int. Cl.
*G06Q 30/02* (2012.01)
*G06N 20/00* (2019.01)
*G06F 3/0485* (2013.01)

(52) U.S. Cl.
CPC ....... *G06Q 30/0255* (2013.01); *G06F 3/0485* (2013.01); *G06N 20/00* (2019.01); *G06Q 30/0244* (2013.01); *G06Q 30/0269* (2013.01); *G06Q 30/0277* (2013.01)

(58) Field of Classification Search
CPC .................... G06Q 30/02; G06Q 30/0255
See application file for complete search history.

(56) References Cited

U.S. PATENT DOCUMENTS

| 9,563,327 | B1* | 2/2017 | Pham | G06F 3/04847 |
| 2010/0312643 | A1* | 12/2010 | Gil | G06Q 30/02 |
| | | | | 705/14.55 |
| 2013/0127727 | A1* | 5/2013 | Allen | G06F 3/0483 |
| | | | | 345/168 |
| 2016/0034429 | A1* | 2/2016 | Wu | G06F 40/114 |
| | | | | 715/251 |
| 2016/0328108 | A1* | 11/2016 | Li | G06F 3/0485 |
| 2017/0032264 | A1* | 2/2017 | Liang | G06N 5/048 |

OTHER PUBLICATIONS

Rauch, "Mobile Documentation: Usability Guidelines, and Considerations for Providing Documentation on Kindle, Tablets, and Smartphones" (published in 2011 IEEE International Professional Communication Conference on Nov. 28, 2011) (Year: 2011).*

* cited by examiner

*Primary Examiner* — James M Detweiler
*Assistant Examiner* — Patrick Kim
(74) *Attorney, Agent, or Firm* — Alexander Chen, Esq.

(57) ABSTRACT

A mobile computer device for browsing one or more internet content by an user comprising an application embedded within said mobile device, said application comprising: a viewing module for said user to view said internet content; an automatic scrolling module wherein said scrolling module moves said internet content up in desired interval; a data gathering module that gathers data of the interaction between said user and said automatic scrolling module and said internet content.

15 Claims, 6 Drawing Sheets ooooSprint Wi-Fi 🛜  10:02 PM  97% 🔋

✕  http://www.newyorker.com/magazine...

≡  THE NEW YORKER  SUBSCRIBE of Canadian Pacific Railway, a company that was established in 1881. Pershing Square bought fourteen per cent of its stock six years ago, and recruited a new C.E.O., who took it from the "worst-run railroad in North America" to the best, in Ackman's appraisal----while reaping a $2.6-billion return on the fund's investment. A less flattering example of Ackman's judgment is the fund's $3.3-billion investment in Valeant, the pharmaceutical company. Valeant was known for borrowing money to buy competitors and then raising the price of their drugs----sometimes by a thousand per cent or more----while closing their R. & D. divisions. Valeant's profits soared, for a time, and other drug companies followed its example. Then Valeant came under federal investigation; its share price is now a fraction of what it was when Pershing Square bought it.

Ads go here.

| 1s | 2s | 3s | 4s | Custom | ⭕ | >\|\| |

230 — (callout to ads area)
210 — (callout to bottom toolbar)

FIG. 2

○○○○Sprint Wi-Fi 🛜    10:02 PM    97% 🔋

✕    http://www.newyorker.com/magazine...

☰    THE NEW YORKER    SUBSCRIBE of Canadian Pacific Railway, a company that was established in 1881. Pershing Square bought fourteen per cent of its stock six years ago, and recruited a new C.E.O., who took it from the "worst-run railroad in North America" to the best, in Ackman's appraisal----while reaping a $2.6-billion return on the 340 — fund's investment. A less flattering example of Ackman's judgment is the fund's $3.3-billion investment in Valeant, the pharmaceutical company. Valeant was known for borrowing money to buy competitors and then raising the price of their drugs----sometimes by a thousand per cent or more----while closing their R. & D. divisions. Valeant's profits soared, for a time, and other drug companies followed its example. Then Valeant came under federal investigation; its share price is now a fraction of what it was when Pershing Square bought it.

| 1s | 2s | 3s | 4s | Custom | ◯ | >|| |

FIG. 3

SYSTEM AND METHOD FOR ONLINE DATA MINING AND ADVERTISEMENT GENERATOR

INCORPORATION BY REFERENCE

This application claims the benefit of priority, under 37 USC 119(e), to the filing date of U.S. provisional patent application No. 62/470,247, titled "System and Method of Automatic Text Pacing," filed on Mar. 11, 2017, and U.S. provisional patent application No. 62/472,173, titled "System and Method of Data Mining and Advertisement Generator," filed on Mar. 16, 2017, which are incorporated herein by reference in their entirety.

FIELD OF THE INVENTION

The present invention is directed generally to a system and method of consumption data collection and mining, and advertisement generation, using Pace Ready Technology (PRT). Specifically, it is directed to a PRT-enabled system and method to collect, analyze, and discover online readers' consumption preferences, and to promote targeted advertisement.

BACKGROUND OF THE INVENTION

Today more than 88.5% US population uses the Internet for a variety of purposes: connecting with family and friends, shopping, getting news, and searching for information. Furthermore, about 99% of the 18-to-29 age group uses the Internet for the foregoing purposes. This statistic is very significant because it indicates that almost all young adults spend time on the Internet. Equally significant is that this 18-to-29 age group is the consumer group all advertisers and businesses love because they begin to have incomes for their consumption demands, and likely develop brand loyalty lasting for at least the next 20 years, to 50 years old or beyond. Obviously, to develop and seize the 18-to-29 age group's brand loyalty is the objective of the online advertisers and businesses.

Therefore, online advertisement is growing fast, and competitive. Online advertisers and ecommerce businesses have raced to find innovative ways to discover and learn consumption behaviors in general, and, for ecommerce objects specifically, and, then, to generate effective advertisement to attract the online users. Google discovers intelligent data in search queries to learn consumption behaviors and interests, and, then, to promote paid merchants' hyperlinks to targeted consumer groups. Facebook discovers intelligent data in members' posts, and preferences, to learn members' consumption behaviors and interests, and, then, to send paid merchants' advertisement to members' homepage. Ecommerce businesses have embedded all kinds of counters and statistics trackers in every single element of a web page to track what and when a user views and/or clicks. Intelligent data, like the amount of time consumers spent on a page, where they came from, what browser they used, and what they clicked on, etc., is used to learn about consumer behaviors, demands, interests, etc., and, based on the knowledge, advertisers and/or businesses devise advertisement strategies to make the consumers aware of the ads, and want to buy the products.

Having a great advertisement strategy without a venue or platform to deliver the ads will not help advertisers or businesses. Thus, online advertisers and businesses have also raced to find innovative ways to deliver ads to online users. Based on the gathered intelligent data of users' consumption behaviors, demands, and interests, online advertisers and businesses have used many technology platforms/mechanisms to deliver the ads. Some use dynamic ads that are programmable to incorporate the familiar elements of a user's idiosyncratic preferences and interests, like incorporating the user's locale, language, etc., or the user's preferences of colors, tastes, interests, etc. Others use announcement banners on web pages with catching arts or video clips. Ecommerce businesses use browser technologies to remember customers' basket contents. If the baskets were not empty when the customers left the sites, ecommerce businesses would email reminders, if they have customers' email. Knowing customers' basket contents also helps businesses to know customers' demands and interests, and, thus, to recommend products.

Another ad delivery technique comes from the traditional print ads. Native advertising is a type of advertising, mostly online, that matches the form and function of the platform upon which it appears. The word "native" refers to this coherence of the content with the other media that appears on the ad delivery platform. In other words, if you removed the brand name, it would fit the style of the publication or the ad delivery platform. Traditional product placement (embedded marketing) is a precursor to native advertising. Instead of embedded marketing's technique of placing the product within the content, in native marketing the product and content are merged. In many cases, it manifests as either an article or video, produced by an advertiser with the specific intent to promote a product, while matching the form and style which would otherwise be seen in the work of the platform's editorial staff.

All of the foregoing advertisement methods/techniques, and many others, are devised to subtlety or unsubtlety capture the user's attention, artfully provoke their demands for consumption, and turn a contact into an initiation of a potential sale. Research suggests that the more subtle, the more blended with the contextual preferences of consumers' behaviors, demands, and/or interests, the more an ad engages the consumers and viewers, and provokes their demands for the products. Obviously, the trick is to blend the advertisement campaign messages with the sites' or pages' look-and-feels, and the consumers' preferences, demands, or interests.

However, with all the advanced and sophisticated advertisement methods, techniques, and tricks, advertisers and businesses still find problems or issues with the current advertisement market. For instance, no one can seem to agree on what exactly media companies should be measuring: Clicks? Page-views? Unique monthly visitors? Time spent on a page? Many advertisers are still attached to the idea of page-views or visitors as representing eyeballs. However, a study done by comScore that looked at ad campaigns in 2012 and 2013 came to the conclusion that 54% of the ads in those campaigns were never shown to a human visitor, and yet they were all no doubt counted as "impressions" or ad views in someone's ad budget.

There are a number of reasons why an ad would not be shown to an actual reader: The ad could be broken, and so it doesn't load or display properly; it may be so slow to load that the person browsing the site clicks away before it is seen (but it's still counted as an impression); and in some cases it may be displayed below the edge of the screen, but still counted as having been seen.

Another problem that highlights the importance of the coherence of ads and the contexts they appear in. There are situations where the surrounding of an ad offends consumers, and gives the brand a bad image. For example, recently, advertisers and businesses found out their ads appeared next to offensive content, including videos posted by terrorism-affiliated groups. It is also a chance to highlight how disconnected online ads have become from the context in which they appear. More than ever, understanding and controlling the context where advertisers or businesses place their ads are critical to win consumers' brand loyalty.

To become a contextual master, there are three areas advertisers and businesses should focus on. Firstly, they must understand who their customer is. Knowing the demographic and psychographics of the target audience is essential, enabling the advertisers and businesses to address customers' individual needs. Secondly, they must remember what the customers have done in the past, including all of the transactions and interactions that have taken place with this specific customer, such as browsing history, shopping cart abandonment, and profile information. Thirdly, they must consider what is happening right now in their customer's world, including the device the customers are using to visit the sites, the customers' current physical locations, time of day, even the current weather, and etc.

For all the foregoing needs for ever accurate and detailed customer information, a new innovative system and method of gathering intelligent consumption data and generating effective advertisement are desirable.

OBJECT OF THE INVENTION

Accordingly, it is an object of this invention to provide an innovative system and method to gather intelligent consumption data.

It is an object of the invention to provide an innovative system and method of generating effective advertisement.

It is another object of the invention to provide an innovative system and method of delivering effective advertisement.

It is another object of the invention to provide an innovative system and method of delivering an ad in a specific location on an online article.

It is another object of the invention to provide an innovative system and method of delivering ads with always visible ad view or impression.

It is another object of the invention to provide an innovative system and method of capturing online advertisement metrics, such as reader count, date and time of the view, duration of the reading, member information like name, locale, age, etc., what type of article a particular member selects to read, how many times a day, week, or month a particular member visits a web site, etc.

It is another object of the invention to provide an innovative system and method of aggregating the online advertisement metrics per demographic, market, or territory.

It is another object of the invention to provide an innovative system and method of automatic text scrolling.

It is another object of the invention to provide an innovative system and method of pre-configuring the speed of an automatic text scrolling.

It is another object of the invention to provide an innovative system and method of on-demand automatic text scrolling.

It is another object of the invention to provide an innovative system and method of automatic text scrolling with a voice-recognition control.

SUMMARY OF INVENTION

In the present invention, a mobile computer device for browsing one or more internet content by an user is disclosed, comprising an application embedded within the mobile device, the application comprising: a viewing module for the user to view the internet content; an automatic scrolling module wherein the scrolling module moves the internet content up in desired interval; a data gathering module that gathers data of the interaction between the user and the automatic scrolling module and the internet content.

In one embodiment, the invention further comprising an artificial intelligence module wherein the artificial intelligence module operates the automatic scrolling module.

In one embodiment, the invention the internet content is selected from the group consisted of text files, graphic files, audio files and video files. In one embodiment, the internet content is further comprised of embedded advertising content. In one embodiment, the automatic scrolling module is comprised of seconds per page module wherein the seconds per page module control the speed to which the internet content moves in desired internal of variable seconds per page.

In one embodiment, the invention wherein the variable seconds per pages is selected from the group consisted of 2 seconds per page, 3 seconds per page, 4 seconds per pages, and 5 seconds per page. In one embodiment, the invention the automatic controlling module further comprising a sliding input module wherein the automatic scrolling module moves the internet content in desired interval base on user's input on the sliding input module. In one embodiment, the invention the automatic controlling module further comprising an advertisement scrolling module wherein the advertisement scrolling module alters the desired interval to an advertising scroll interval when the internet content is comprised of an advertisement content and the advertisement content is displayed in the viewing module. In one embodiment, the invention the advertisement scrolling module speeds up the desired interval when the advertisement content is displayed in the viewing module. In one embodiment, the invention the advertisement scrolling module slows down the desired interval when the advertisement content is displayed in the viewing module. In one embodiment, the invention the data gathering module collects data relating to the interaction between the type of internet content versus the desired interval of the internet content.

In one embodiment, the invention the data gathering module collects data relating to the interaction between the type of internet content versus the desired interval of the internet content. In one embodiment, the invention the data gathering module collects data relating to the interaction between the type of internet content versus the desired interval of the internet content. In one embodiment, the invention the artificial intelligence preschedule the desired interval of the automatic scrolling module based on the data collected by the data gather module. In one embodiment, the invention the data gathering module collects data relating to the interaction between the type of internet content versus the desired interval of the internet content.

In one embodiment, the invention the data gathering module collects data relating to the interaction between the advertising interval and the click through rate of the advertising content. In one embodiment, the invention wherein the data gathering module further collects data relating to the interaction between the advertising interval and the click through rate of the advertising content and user's attributes. In one embodiment, the invention the artificial intelligence module controls the advertisement scrolling module to achieve highest click through rate base on user's attributes.

BRIEF DESCRIPTION OF THE DRAWINGS

These and other features and advantages of the invention will not be described with reference to the drawings of certain preferred embodiments, which are intended to illustrate and not to limit the invention, and in which

FIG. 2 is an illustration of an embodiment of an automatic text scroller having a control panel and an ad banner in content.

FIG. 3 is an illustration of an embodiment of an automatic text scroller having a control panel, and an embedded ad.

DETAILED DESCRIPTION OF THE INVENTION

Some embodiments are described in detail with reference to the related drawings. Additional embodiments, features, and/or advantages will become apparent from the ensuing description or may be learned by practicing the invention. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed. It should be noted that references to "an" or "one" or "some" embodiment(s) in this disclosure are not necessarily to the same embodiment, and such references mean at least one.

The present invention has been conceived with the aim of addressing one or more problems of current flexible temples. More specifically, the present invention is directed to a method and apparatus for an automatically adjusted eyewear temple.

Figure 1:
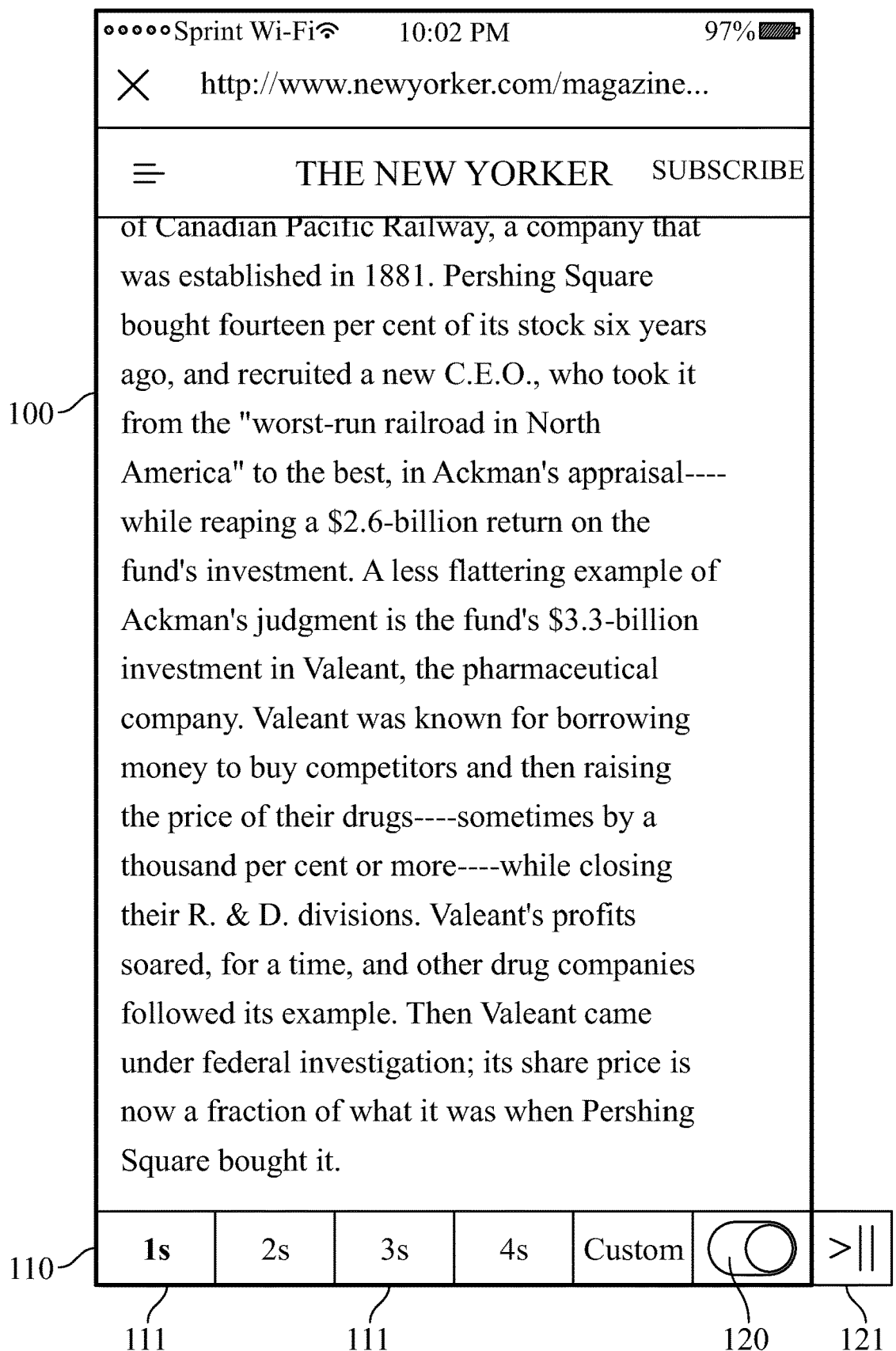
FIG. 1 is an illustration of an embodiment of an automatic text scroller having a control panel.

Referring to FIG. 1, an illustrative view of an embodiment of the current invention is shown, consisting of a viewer (viewing module) 100, a control panel (automatic scrolling module) 110 that comprises scrolling speed control buttons (seconds per page module) 111, a scrolling speed control slider (sliding input module) 120, and a scrolling Go or Pause button 121. The viewer 100 displays content of a content provider in the format preset in the reader's system. In other words, the current invention intelligently uses and gets the benefits of the settings of the over system look-and-feel. It is appreciated that the user/reader can always customize the look-and-feel of the viewer and the application in general by using the provided configuration manager component of the application, which will be disclosed infra. The viewer 100 screen real estate is used to display content and any embedded ads. The ads are strategically and intelligently embedded based on the intelligent consumption data gathered by the provider or advertiser. The content in the viewer is caused to automatically scroll at a preset speed, 1-5 s or any custom speed, or on demand by selecting one of the speed buttons on the control panel 110. Selecting buttons 111 the application will scroll the content up every 1 second, or 2, 3, etc. seconds. The control panel 110 also comprises a speed control slider 120 that provides an alternative to set the scrolling speed. It is appreciated that other embodiments provide either speed control buttons or slider, but not both, to save screen real estate for other purposes, perhaps. With the same goal, the Go or Pause toggle button 121 can be optional if the display is a touch screen. On such a device and display, Go and Pause functions can be implemented to allow the reader to tap the screen to toggle the Go and Pause functions, and to scroll the content or to pause the scrolling.

Still referring to FIG. 1, in this embodiment, a cell phone is shown as the hardware system. It is appreciated that the current invention will be cross-platform and can be deployed to different systems such as PC, tablets, electronic readers, smart devices, etc. with minimal modification. For providers and advertisers, the more screen real estate there is for ads, the better. The current invention will maximize its advantages in a larger screen hardware system.

Referring to FIG. 2, an illustrative view of an embodiment of the current invention is shown. This embodiment has a control panel 210 that comprises an ad banner (advertisement display module) 230. The ad banner 230 provides one of the application's ad spaces and dynamic ad delivering mechanism. In this embodiment, the ad banner 230 is placed above the speed buttons, but it is appreciated that the position of the banner relative to the speed buttons is customizable. The ad banner is programmable, and can host all dynamic ads, such as animation, interactive, video, etc. More importantly, since the control panel must always be visible and working for the application to work properly, any ad to be displayed is also visible and working properly. Thus, as an objective of this invention, this always visibility of an ad solves the current problem of 54% ads not being seen by consumers because of display or technical errors as discussed in the Background of the Invention section. Furthermore, the ad banner and the ad within are always visible to the reader. In one embodiment, the longer the reader stays reading, the more ads can be displayed.

Referring to FIG. 3, an illustrative view of an embodiment of the current invention is shown. This embodiment of the current invention has an ad banner 340 embedded within the provided content. It is appreciated that the ad banner 340 is intelligently and strategically placed within the content, based on the intelligent consumption data gathered by the providers and/or advertisers about a particular reader and/or the consumer group the reader belongs to. The intelligent data also includes the reader's locale, culture, language, etc. It also includes the contextual information comprising the type of the content, e.g., political, economic, product review, editorial, opinion, thriller fiction, romance fiction, etc., and the reader's/consumer's preferences and interests. It is appreciated that an ad will likely be inserted between two paragraphs of relevant context, content, or ideas, or all of these factors. It is also appreciated that the position of an ad is customizable and can be preset. In all cases, an ad is visible because it is embedded in a content. In one embodiment, a module is enabled that collects news articles from all major news feeding outlets and feeds back to the current invention where the system provides constant news data for which the browser of the present invention is used to view. In yet another embodiment, the system of the current invention can be used as an ad-on technology as browser for other content provider in mobile device viewing setting. In this embodiment of deployment, the content provider may share revenue with the system provider or conversely pay per use for deploying the browser technology.

Figure 4:
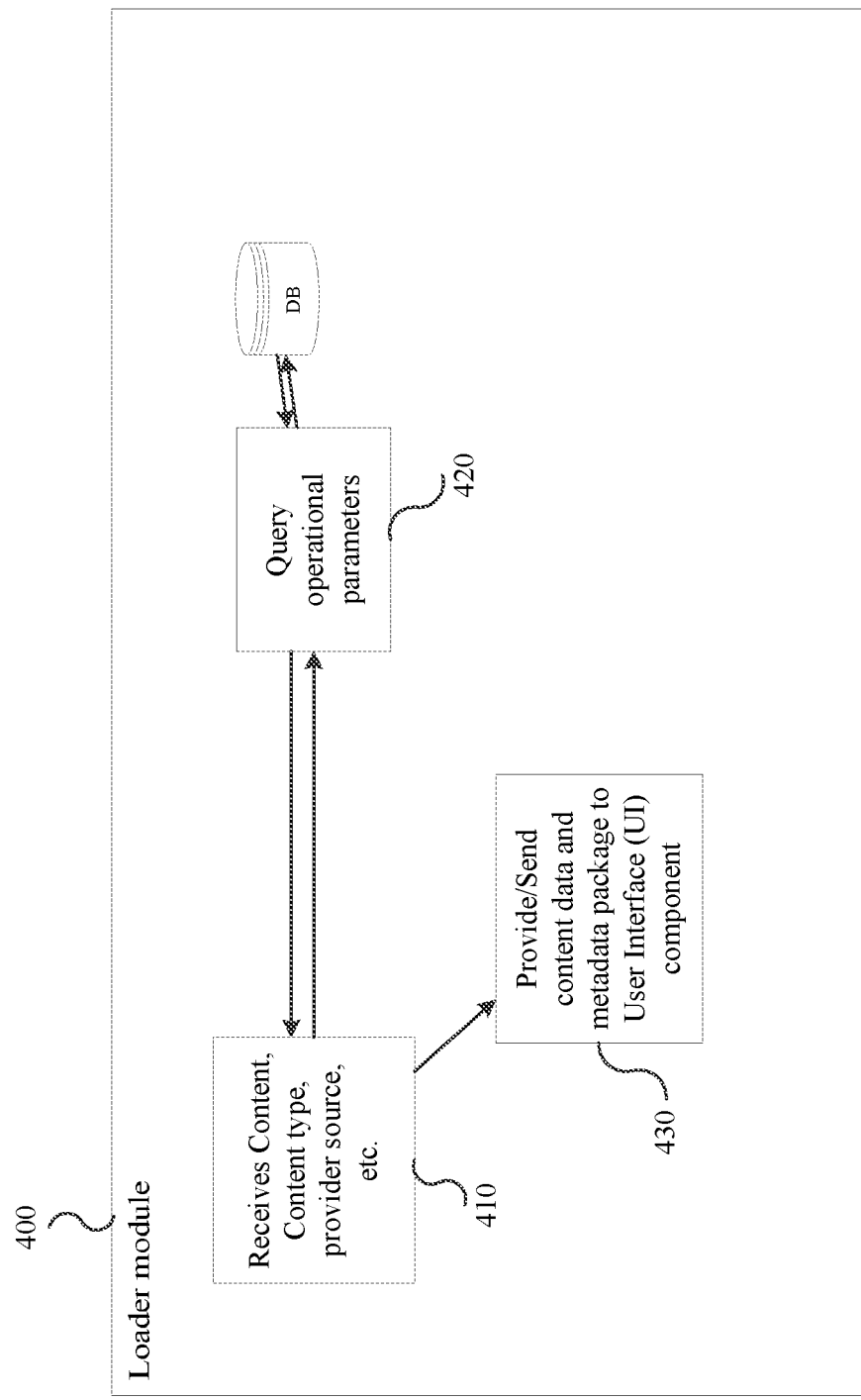
FIG. 4 is an exemplary loader component.

Referring to FIG. 4, a flowchart of an exemplary loading process is shown. Along with a request to open or launch, the loader module 400 receives content, its content type, provider's source, etc. The loader processor 410 will query operational parameters from the application's database 420, such as scrolling speed, ad view speed, etc. The database component 420 returns the queried data to the loader processor 410, which will send all data to the UI rendering component 430. For the first-ever launch, the loader will get default parameters that inserted into the application database when it was installed with the application. These default parameters are the average use cases good for an average reader. After the first-ever launch, and the reader/user starts using the application, she would customize the application using the control panel. The changes will be recorded and saved to the database, and override the initial default parameters. In one embodiment, the reader/user can choose whether to activate the operational data collection function of the built-in Artificial Intelligence (AI) component. When activated for collecting operational data, the AI component collects operational data about how the user/reader controls the viewer and application. For instance, for each genre or type of content, the viewer's scrolling speed is recorded, and remembered for subsequent uses.

The built-in AI component generally, even without the operational data collection function activated, records where the reader/user usually pauses the viewer, and the duration of the pause. This behavioral data is also useful for discovering the reader's consumption preferences, behaviors, or demands. For example, where the reader reads a product review, e.g., a smart phone review, the AI component can record whether she reads all subsections at the same scrolling speed, or whether she skips certain subsections by speeding up, and slows down at other certain subsections, like, the phone design, screen resolution and size, camera resolution, etc. This behavioral data probably suggests this user prefers the appearance and social uses of the phone over processing power and computing functionality. This suggests that this user is a casual user, not a business user, who tends to prefer large and powerful phone to run her business applications.

It is appreciated that many other intelligent consumption data can similarly collected for other type of content, such as political, economic, product review, editorial, opinion, thriller fiction, romance fiction, etc., at paragraph and reader's eye view level. The current invention does not stop at collecting high level intelligent consumption data based on categories, topics, titles, etc. It can collect intelligent consumption data at granular reader's eye view, subsection, or paragraph level.

Figure 5:
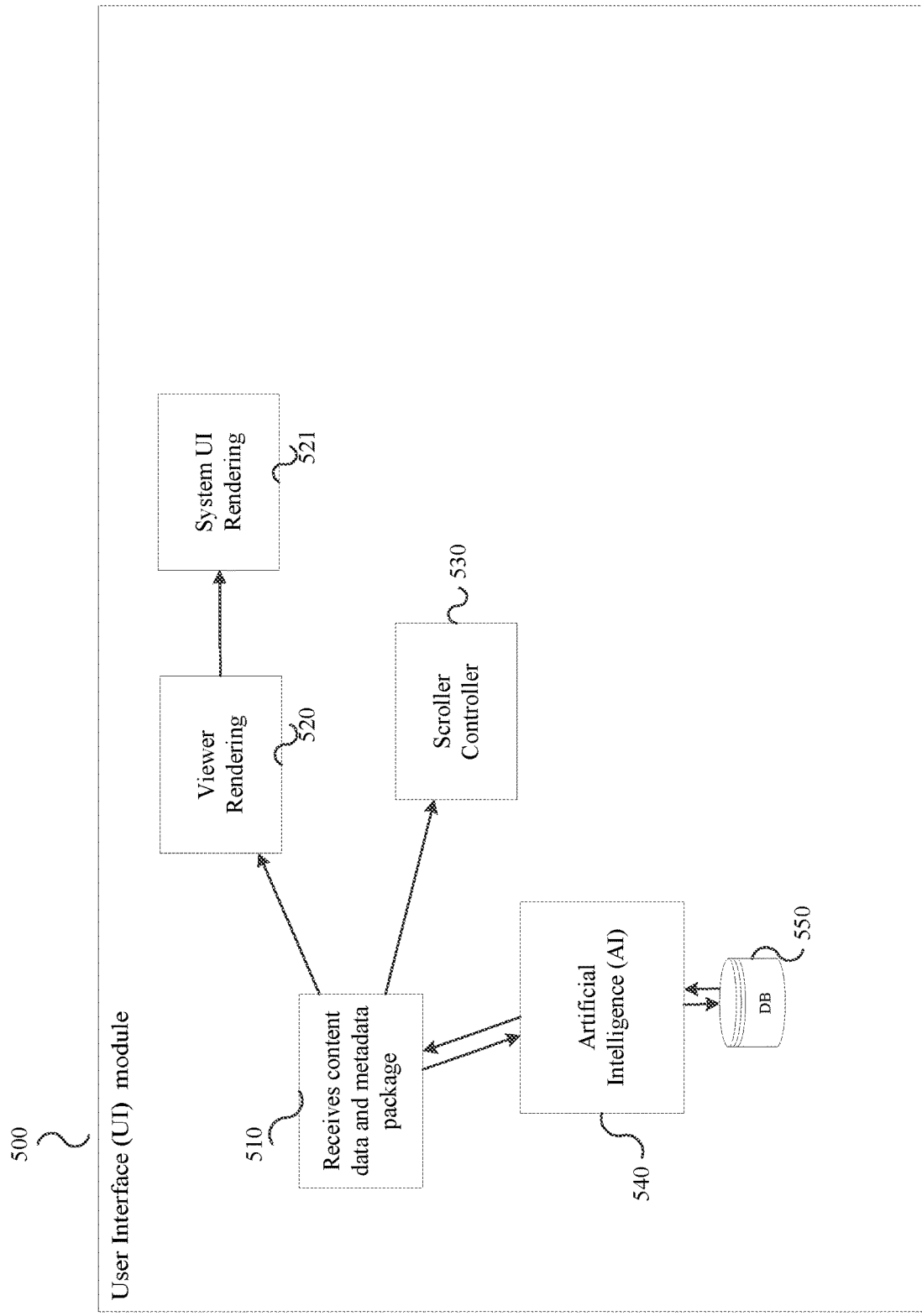
FIG. 5 is a flowchart of an exemplary UI component's process.

Referring to FIG. 5, a flowchart of an exemplary rendering of a viewer is shown. After receiving content data and metadata package from the loader disclosed in FIG. 4, the processor component 510 of the User Interface (UI) module 500 parses the data and sends the appropriate data to UI or viewer rendering component 520, which in turn sends the appropriate data to the system UI rendering engine 521 to render the viewer on the device's screen. The viewer rendering component 520 also renders the control panel and any ad banner preset by the content provider or advertiser. The processor component 510 also sends scrolling speed parameters to the scroller controller component 530, disclosed infra. While the viewer is used, the UI module records the user's usage and behavior data, as disclosed above, and sends the data to the AI component 540 for processing and saving to the application database 550. In subsequent uses, the viewer and the application in general use the gathered intelligent data to be more responsive to the user's preferences and interests.

Figure 6:
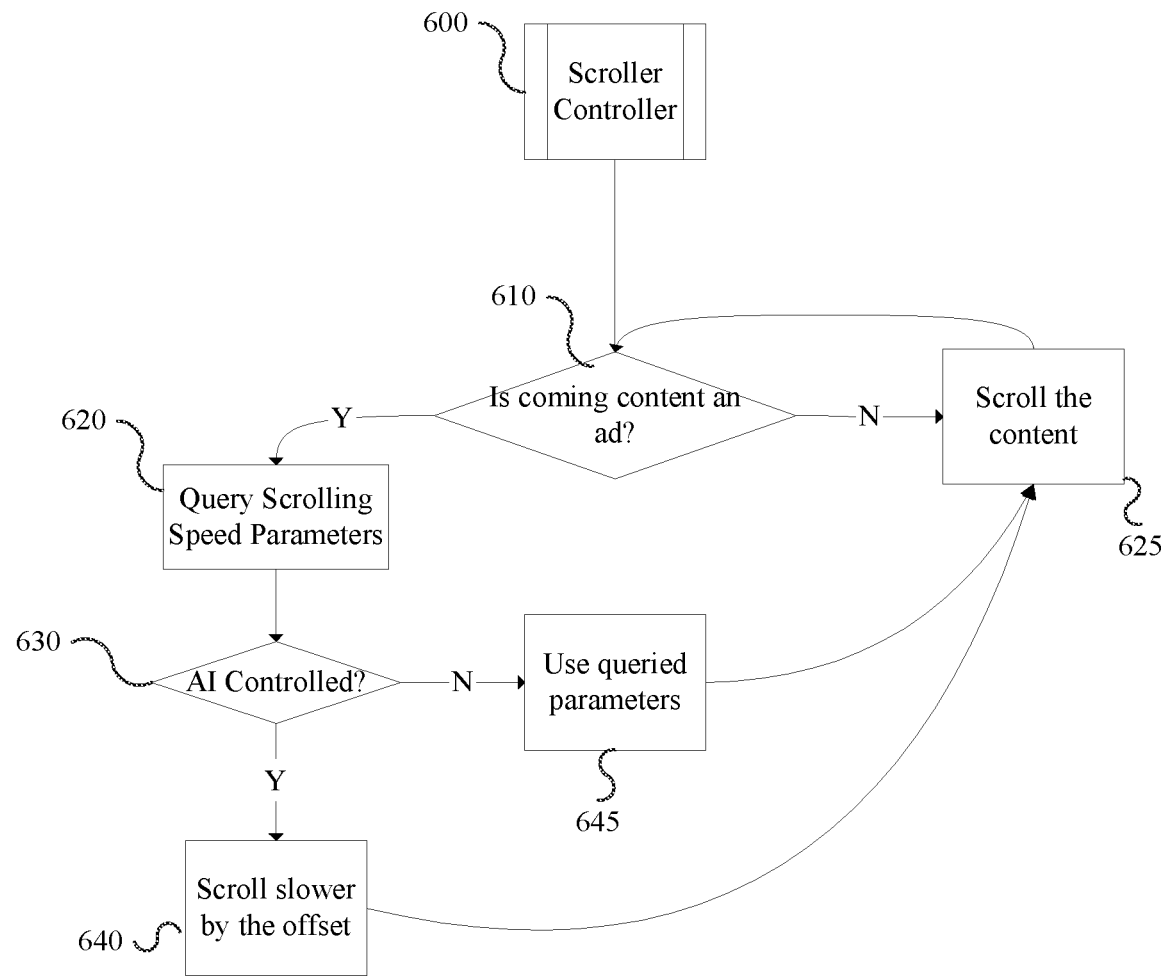
FIG. 6 is a flowchart of a scrolling control process.

Referring to FIG. 6, in another embodiment, a flowchart of an exemplary current invention's control of the viewer's scrolling speed, and, thus, the duration of an ad view. When the scrolling controller module 600 receives a request to cause a scrolling, it will determine whether the coming content/text is an embedded ad, illustrated by decision 610. If the answer is No, the scrolling controller will request a process 625 to scroll the content at the pre-configured scrolling speed. If the answer is Yes, it will query scrolling speed parameters from the application's database, via process 620, in preparation for the follow-up inquiries. It needs to determine whether scrolling process is AI controlled or pre-configured, via decision 630. If it is AI controlled, a process 640 will send a scrolling speed offset along with a request to the process 625, which will override the non-ad content's scrolling speed and reduce or increase the scrolling speed by a provider's preset offset. As an effect, the ad will stay in the reader's view longer or shorter. If the scroll control is not AI controlled, but pre-configured, the scrolling controller module will use the preset scrolling speed parameters queried from the database, via process 645. It, then, sends the queried parameters along with a request to the process 625 to scroll the content. It is appreciated that the speed control slider is always available for the reader to control the scroll speed. The reader can also pause the scrolling by selecting Pause. On a touch screen device, the reader can pause by tapping anywhere on the screen. On traditional devices, like a PC, the reader can select the Pause button on the control panel. The AI controlled process, in one embodiment, changes offset the scrolling speed so as to increase the click through rate of the banners.

It is appreciated that the gathered intelligent data is aggregated in accordance to certain advertisement and/or marketing metrics, and is available to providers, advertisers, and businesses. Intelligent data from different readers/users is aggregated to create intelligent statistics of different demographic and/or age groups. Studying these statistics will give advertisers and businesses insight into different segments of the market.

It is also appreciated that one embodiment of the current invention will tap into the host system's voice recognition capability, if one exists. Using the voice command capability, a user can speak operational commands, such as Go, Pause, Speed Up or Down, etc., to the application to achieve the same effect as selecting the buttons on the control panel.

The invention claimed is:
1. A mobile computer device for browsing one or more internet content by a user, said mobile computing device comprising:
one or more processors, the one or more processors executing an application embedded within said mobile computer device, said application comprising:
a. a viewing module displaying said internet content and respective user selectable buttons of 2 seconds per page, 3 seconds per page, 4 seconds per page, 5 seconds per page, custom seconds per page, and a user-controlled slider;
b. an automatic scrolling module moving said internet content within said viewing module in a desired interval based on said user's input;
c. a data gathering module gathering data of the interaction between said user and said automatic scrolling module and said internet content;
wherein said automatic scrolling module comprises a seconds per page module controlling the speed to which said internet content moves in said desired interval of variable seconds per page; and
wherein said seconds per page module is configured to one of settings of 2 seconds per page, 3 seconds per page, 4 seconds per page, 5 seconds per page, and custom seconds per page.
2. The mobile computer device of claim 1 further comprising an artificial intelligence module wherein said artifi- cial intelligence module operates said automatic scrolling module without said user's input.

3. The application of claim 1 wherein said internet content is selected from a group consisting of text files, graphic files, audio files and video files.

4. The mobile computer device of claim 1 wherein said internet content is further comprised of embedded advertising content.

5. The mobile computer device of claim 1 wherein said automatic controlling module further comprising a sliding input module wherein said automatic scrolling module moves said internet content in a desired interval base on user's input on said sliding input module.

6. The mobile computer device of claim 1 further comprising an advertisement display module wherein said advertisement display module displays advertisement banners within said viewing module.

7. The mobile computer device of claim 6 wherein said advertisement display module displays advertisement banners within said viewing module by placing advertisement banners within said internet content.

8. The mobile computer device of claim 1 wherein said automatic controlling module further comprising an advertisement scrolling module wherein said advertisement scrolling module alters said desired interval to an advertising scroll interval when said internet content is comprised of an advertisement content and said advertisement content is displayed in said viewing module.

9. The mobile computer device of claim 6 wherein said advertisement scrolling module speeds up said desired interval when said advertisement content is displayed in said viewing module.

10. The mobile computer device of claim 6 wherein said advertisement scrolling module slows down said desired interval when said advertisement content is displayed in said viewing module.

11. The mobile computer device of claim 1 wherein said data gathering module collects data relating to an interaction between a type of internet content versus the desired interval of said internet content.

12. The mobile computer device of claim 2 wherein said artificial intelligence module preschedules the desired interval of the automatic scrolling module based on the data collected by said data gathering module.

13. The mobile computer device of claim 6 wherein said data gathering module collects data relating to the interaction between the advertising interval and the click through rate of said advertising content.

14. The mobile computer device of claim 12 wherein said data gathering module further collects data relating to an interaction between the advertising interval and the click through rate of said advertising content and a user's attributes.

15. The mobile computer device of claim 1 wherein said artificial intelligence module controls said advertisement scrolling module to achieve a highest click through rate base on the user's attributes.

* * * * *